United States Patent
Liu et al.

(10) Patent No.: US 11,643,076 B2
(45) Date of Patent: May 9, 2023

(54) FORWARD COLLISION CONTROL METHOD AND APPARATUS, ELECTRONIC DEVICE, PROGRAM, AND MEDIUM

(71) Applicant: SHENZHEN SENSETIME TECHNOLOGY CO., LTD., Shenzhen (CN)

(72) Inventors: Wenzhi Liu, Shenzhen (CN); Chendi Yu, Shenzhen (CN); Xingyu Zeng, Shenzhen (CN); Shuai Yi, Shenzhen (CN); Yuanyang Tong, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 387 days.

(21) Appl. No.: 16/886,596

(22) Filed: May 28, 2020

(65) Prior Publication Data
US 2020/0290608 A1  Sep. 17, 2020

Related U.S. Application Data

(63) Continuation of application No. PCT/CN2019/082403, filed on Apr. 12, 2019.

(30) Foreign Application Priority Data

Apr. 20, 2018  (CN) .......................... 201810360844.5

(51) Int. Cl.
*B60W 30/095* (2012.01)
*B60W 10/18* (2012.01)
(Continued)

(52) U.S. Cl.
CPC ........ *B60W 30/0956* (2013.01); *B60W 10/18* (2013.01); *B60W 10/20* (2013.01);
(Continued)

(58) Field of Classification Search
CPC .. B60W 30/0956; B60W 10/18; B60W 10/20; B60W 30/09; B60W 2554/00;
(Continued)

(56) References Cited

U.S. PATENT DOCUMENTS 6,246,961 B1  6/2001 Sasaki
7,284,769 B2  10/2007 Breed
(Continued)

FOREIGN PATENT DOCUMENTS

CN  102303605 A  1/2012
CN  102390320 A  3/2012
(Continued)

OTHER PUBLICATIONS

Song, Wenjie, et al. "Lane detection and classification for forward collision warning system based on stereo vision." IEEE Sensors Journal 18.12 (2018): 5151-5163. (Year: 2018).*
(Continued)

*Primary Examiner* — Russell Frejd
*Assistant Examiner* — Ana D Thomas
(74) *Attorney, Agent, or Firm* — Cooper Legal Group, LLC

(57) ABSTRACT

Embodiments of the present disclosure disclose forward collision control methods and apparatuses, electronic devices, programs, and media, where the forward collision control method includes: detecting a forward suspected collision object on a road where a current traveling object is located on the basis of a neural network; predicting the collision time between the current traveling object and the suspected collision object; and performing forward collision control on the current traveling object according to the collision time, where the forward collision control includes forward collision warning and/or driving control.

20 Claims, 4 Drawing Sheets

(51) Int. Cl.
*B60W 10/20* (2006.01)
*B60W 30/09* (2012.01)
*G06N 3/02* (2006.01)
*G08G 1/16* (2006.01)

(52) U.S. Cl.
CPC ............... *B60W 30/09* (2013.01); *G06N 3/02* (2013.01); *G08G 1/166* (2013.01); *B60T 2201/022* (2013.01); *B60W 2554/00* (2020.02)

(58) Field of Classification Search
CPC ....... B60W 2552/53; B60W 2554/801; B60W 2554/802; B60W 50/14; B60W 2554/80; B60W 2710/18; B60W 2710/20; G06N 3/02; G06N 3/08; G08G 1/166; B60T 2201/022; G06F 18/22; G06F 18/24
See application file for complete search history.

(56) References Cited

U.S. PATENT DOCUMENTS

| | | | |
|---|---|---|---|
| 10,007,854 B2 | 6/2018 | Blayvas et al. | |
| 2007/0206849 A1 | 9/2007 | Sakata | |
| 2010/0191391 A1* | 7/2010 | Zeng ...................... | G01S 13/87 701/1 |
| 2018/0005054 A1 | 1/2018 | Yu et al. | |
| 2018/0012085 A1* | 1/2018 | Blayvas .................. | H04N 23/45 |
| 2018/0075309 A1 | 3/2018 | Sathyanarayana et al. | |

FOREIGN PATENT DOCUMENTS

| | | |
|---|---|---|
| CN | 102745194 A | 10/2012 |
| CN | 105270398 A | 1/2016 |
| CN | 106407931 A | 2/2017 |
| CN | 107346612 A | 11/2017 |
| CN | 107380164 A | 11/2017 |
| CN | 107657237 A | 2/2018 |
| CN | 108725440 A | 11/2018 |
| DE | 102011106485 A1 | 11/2012 |
| EP | 0582236 B1 | 6/1998 |
| JP | 2008021269 A | 1/2008 |
| JP | 2008507454 A | 3/2008 |
| JP | 2011517632 A | 6/2011 |
| JP | 2013105432 A | 5/2013 |
| JP | 2017010560 A | 1/2017 |
| JP | 2019533609 A | 11/2019 |
| KR | 20020055094 A | 7/2002 |

OTHER PUBLICATIONS

"Spindle Net: Person Re-identification with Human Body Region Guided Feature Decomposition and Fusion", 2017, Haiuy Zhao, Maoqing Tian, Shuyang Sun, Jing Shao, Junjie Yan Shuai YP, Xiaongang Wang and Xiaoou Tang, IEEE Conference on Computer Vision and Pattern Recognition (CVPR), https://ieeexplore.ieee.org/document/8099586/, 9 pgs.
Written Opinion of the Singaporean application No. 11202005082R, dated May 27, 2021, 7 pgs.
First Office Action of the Japanese application No. 2020-545852, dated Jun. 25, 2021, 10 pgs.
English translation of the Written Opinion of the International Search Authority in the international application No. PCT/CN2019/082403, dated Jul. 17, 2019, 5 pgs.
International Search Report in the international application No. PCT/CN2019/082403, dated Jul. 17, 2019, 2 pgs.
First Office Action of the Chinese application No. 201810360844.5, dated Sep. 3, 2019, 32 pgs.

* cited by examiner

FORWARD COLLISION CONTROL METHOD AND APPARATUS, ELECTRONIC DEVICE, PROGRAM, AND MEDIUM

CROSS-REFERENCE TO RELATED APPLICATION

This is a continuation application of International Patent Application No. PCT/CN2019/082403, filed on Apr. 12, 2019, which claims priority to Chinese Patent Application No. 201810360844.5, filed with the Chinese Patent Office on Apr. 20, 2018, and entitled "FORWARD COLLISION CONTROL METHODS AND APPARATUSES, ELECTRONIC DEVICES, PROGRAMS, AND MEDIA". The disclosures of International Patent Application No. PCT/CN2019/082403 and Chinese Patent Application No. 201810360844.5 are incorporated herein by reference in their entireties.

BACKGROUND

A forward collision warning system can predict the travelling danger, give an alarm to a driver before a period of time (e.g. two to three seconds) when the collision danger occurs to prevent traffic events, and is called as "a never-wearied third eye". A result of analysis on the vehicle traffic event shows that about 80% traffic events of all the traffic events are caused due to the fact that the driver does not react timely or deal with it properly. About 65% traffic events are caused by a rear-end collision, and the rest are caused by the side impact and the scratch. A survey result from Daimler Benz shows that an alarm given ahead of 0.5 second can prevent about 60% rear-end events, and an alarm given ahead of 1.5 seconds can prevent about 90% rear-end events.

Therefore, installing a vehicle collision warning system on an automobile is an efficient technical measure of reducing traffic events.

SUMMARY

The present disclosure relates to computer vision technologies, and in particular, to forward collision control methods and apparatuses, electronic devices, programs, and media.

Embodiments of the present disclosure provide a forward collision control solution.

According to one aspect of the embodiments of the present disclosure, a forward collision control method is provided, including:

detecting a forward suspected collision object on a road where a current traveling object is located on the basis of a neural network;

predicting the collision time between the current traveling object and the suspected collision object; and performing forward collision control on the current traveling object according to the collision time, where the forward collision control includes forward collision warning and/or driving control.

According to another aspect of the embodiments of the present disclosure, a forward collision control apparatus is provided, including:

a first detection module, configured to detect a forward suspected collision object on a road where a current traveling object is located on the basis of a neural network;

a first prediction module, configured to predict the collision time between the current traveling object and the suspected collision object; and a control module, configured to perform forward collision control on the current traveling object according to the collision time, where the forward collision control includes forward collision warning and/or driving control.

According to yet another aspect of the embodiments of the present disclosure, an electronic device is provided, including:

a memory, configured to store computer programs; and a processor, configured to execute the computer programs stored in the memory, where when the computer program is executed, the forward collision control method according to any one of the embodiments of the present disclosure is implemented.

According to a further aspect of the embodiments of the present disclosure, a compute readable storage medium is provided. Computer programs are stored thereon, and when the computer programs are executed by a processor, the forward collision control method according to any one of the embodiments of the present disclosure is implemented.

According to a further aspect of the embodiments of the present disclosure, a computer program is provided, including computer instructions, where when the computer instructions are operated in a processor of a device, the forward collision control method according to any one of the embodiments of the present disclosure is implemented.

The following further describes in detail the technical solutions of the present disclosure with reference to the accompanying drawings and embodiments.

BRIEF DESCRIPTION OF DRAWINGS

The accompanying drawings constituting a part of the specification describe the embodiments of the present disclosure and are intended to explain the principles of the present disclosure together with the embodiments.

According to the following detailed embodiments, the present disclosure may be understood more clearly with reference to the accompanying drawings.

DETAILED DESCRIPTION

Figure 1:
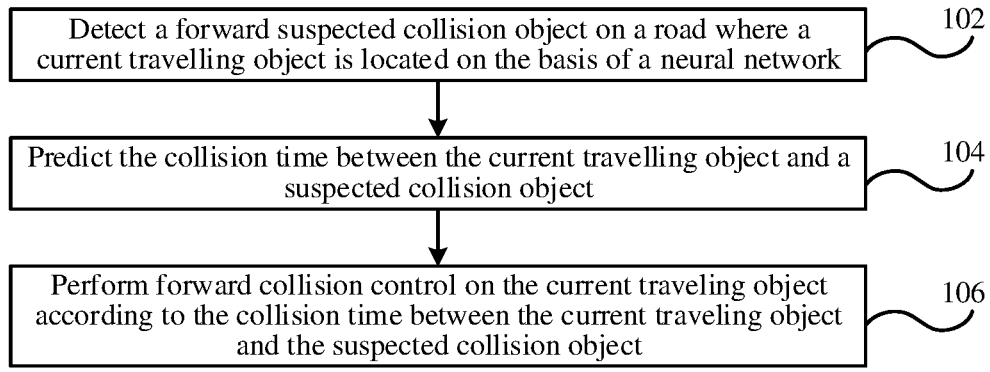
FIG. 1 is a flowchart of an embodiment of a forward collision control method according to the present disclosure.

According to the forward collision warning method and apparatus, the electronic device, the program, and the medium provided in the embodiments of the present disclosure, a forward suspected collision object on a road where a current traveling object is located is detected on the basis of a neural network, and suspected collision objects (e.g. a vehicle, pedestrian, a non-motorized vehicle, a robot, and an obstruction) are detected by utilizing deep learning to improve the accuracy and the precision of the detection result; the collision time between the current traveling object and the suspected collision object is predicted, and forward collision control is performed on the current traveling object according to the collision time, where the forward collision control includes forward collision warning and/or driving control, thereby performing forward collision warning and/or driving control on the current traveling object, improving the precision of forward collision warning and driving control, and facilitating reducing road traffic events.

Various exemplary embodiments of the present disclosure are now described in detail with reference to the accompanying drawings. It should be noted that: unless otherwise stated specifically, relative arrangement of the components and operations, the numerical expressions, and the values set forth in the embodiments are not intended to limit the scope of the present disclosure.

It should be further understood that in the embodiments of the present disclosure, "a plurality of" may refer to two or more, and "at least one" may refer to one, two, or more.

Persons skilled in the art may understand that terms "first", "second", etc. in the embodiments of the present disclosure are only used for distinguishing different operations, devices, or modules, and do not represent any special technical meanings, and likewise do not represent necessary logic orders therebetween.

It should be further understood that any component, data, or structure mentioned in the embodiments of the present disclosure should be generally understood as one or more under the condition that no explicit definition is provided or no opposite motivation is provided in the context.

It should be further understood that the description of the embodiments of the present disclosure emphasizes the differences between the embodiments, and the same or similar points therebetween may be used as reference and are omitted for clarity.

In addition, it should be understood that, for ease of description, the size of each part shown in the accompanying drawings is not drawn in actual proportion.

The following embodiments of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

In addition, the term "and/or" in the present disclosure only describes an association relation between associated objects, indicating that three relations may exist, for example, A and/or B may indicate three conditions, i.e., A exists separately, A and B exist at the same time, and B exists separately. In addition, the character "/" in the present disclosure generally represents the preceding and latter associated objects are in an "or" relation.

The embodiments of the present disclosure may be applied to electronic devices such as terminal devices, computer systems, and servers, which may operate with numerous other general-purpose or special-purpose computing system environments or configurations. Examples of well-known computing systems, environments, and/or configurations suitable for use together with the computer systems/servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems.

The electronic devices such as terminal devices, computer systems, and servers may be described in the general context of computer system executable instructions (for example, program modules) executed by the computer system. Generally, the program modules may include routines, programs, target programs, components, logics, data structures, and the like for performing specific tasks or implementing specific abstract data types. The computer systems/servers may be practiced in the distributed cloud computing environments in which tasks are executed by remote processing devices that are linked through a communications network. In the distributed computing environments, the program modules may be located in local or remote computing system storage media including storage devices.

In the process of implementing the present disclosure, after research, the applicant discovers that obstruction detection is still made in the current forward collision warning system according to the traditional vision technology. Such processing causes low recognition rate and target matching rate at the source, and bad performance and effect of forward collision warning of the system.

FIG. 1 is a flowchart of an embodiment of a forward collision control method according to the present disclosure. As shown in FIG. 1, the forward collision control method according to this embodiment includes the following operations.

At 102, a forward suspected collision object on a road where a current traveling object is located is detected on the basis of a neural network.

In some implementation methods of the embodiments of the present disclosure, the type of the current traveling object, for example, may include, but is not limited to: a vehicle, a robot, etc. The type of a suspected collision object, for example, may include, but is not limited to any one or more of: a person, a vehicle, a non-motorized vehicle, a robot, an obstruction, etc. The vehicle, for example, may be any traveling objects such as an automobile, an electric vehicle, and a toy vehicle.

In some implementation methods of the embodiments of the present disclosure, a neural network can detect a target object in a frame image on the basis of architectural approaches such as RFCN, SSD, RCNN, FastRCNN, FasterRCNN, SPPNet, DPM, OverFeat, and YOLO so as to obtain a suspected collision object.

In an optional example, the operation 102 may be executed by a processor by invoking a corresponding instruction stored in a memory, or may be executed by a first detection module run by the processor.

At 104, the collision time between the current traveling object and the suspected collision object is predicted.

In an optional example, the operation 104 may be executed by a processor by invoking a corresponding instruction stored in a memory, or may be executed by a first prediction module run by the processor.

At 106, forward collision control is performed on the current traveling object according to the collision time between the current traveling object and the suspected collision object, where the forward collision control, for example, may include, but is not limited to: forward collision warning and/or driving control.

In the embodiments of the present disclosure, forward collision warning, for example, may be performed by means of, but is not limited to hearing and vision. In the hearing form, forward collision warning, for example, may be performed by means of a buzzer sound, etc. In the vision form, forward collision warning, for example, may be performed by means of indicator flash, etc.

In one optional example, the operation 106 may be performed by the processor invoking a corresponding instruction stored in the memory, and may also be executed by a control module run by the processor.

The driving control according to the embodiments of the present disclosure refers to a control action for changing the movement state and/or movement direction of the current traveling object, for example, may include: control actions that can change the movement direction and/or movement state of the current traveling object, including accelerating, braking deceleration, changing a driving direction of the current traveling object and the like. For example, in an actual application scene, if the original movement direction of the current vehicle is keeping straight in the lane, and the current vehicle collides with a suspected collision object ahead on the basis of the collision time, the driving direction of the current vehicle can be changed by means of driving control so that the current vehicle changes the lane to avoid the collision. If the suspected collision object ahead accelerates to drive away in the process, the driving direction of the current vehicle can be changed by means of driving control so that the current vehicle maintains the original movement direction and keeps straight in the lane.

According to the forward collision control method provided in the embodiments of the present disclosure, a forward suspected collision object on a road where a current traveling object is located is detected on the basis of a neural network, and suspected collision objects (e.g. a vehicle, pedestrian, a non-motorized vehicle, a robot, and an obstruction) are detected by utilizing deep learning to improve the accuracy and the precision of the detection result; the collision time between the current traveling object and the suspected collision object is predicted, and forward collision control is performed on the current traveling object according to the collision time, where the forward collision control includes forward collision warning and/or driving control, thereby performing forward collision warning and/or driving control on the current traveling object, improving the precision of forward collision warning and driving control, and facilitating reducing road traffic events.

In some implementation methods of the embodiments of the present disclosure, in operation 102, detecting a forward suspected collision object on a road where a current traveling object is located on the basis of a neural network may include the following operations.

A detection result of a lane line on the road is acquired. In some optional examples, a detection result of a lane line on the road, for example, may be acquired by the following approaches: detecting the lane line on the road in a fame image on the basis of a neural network, i.e., also taking the lane line as a target object for detecting to obtain the detection result of the lane line; or directly acquiring the detection result of the lane line from an Advanced Driver Assistance System (ADAS) and using the detection result of the lane line in the ADAS.

At least some of target objects on the road are determined as suspected collision objects on the basis of the detection result of the lane line.

In some optional examples, if the detection result of a lane line is detected lane line information, where the information, for example, may be a pixel point tag or a pixel point position of the lane line in a frame image, at least some of target objects in the lane where the current traveling object is located are selected as suspected collision objects according to the lane line information; if the detection result of the lane line is that no lane line is detected, a target object having the distance from the current traveling object within a preset range (e.g. five meters) can be selected as a suspected collision object.

Figure 2:
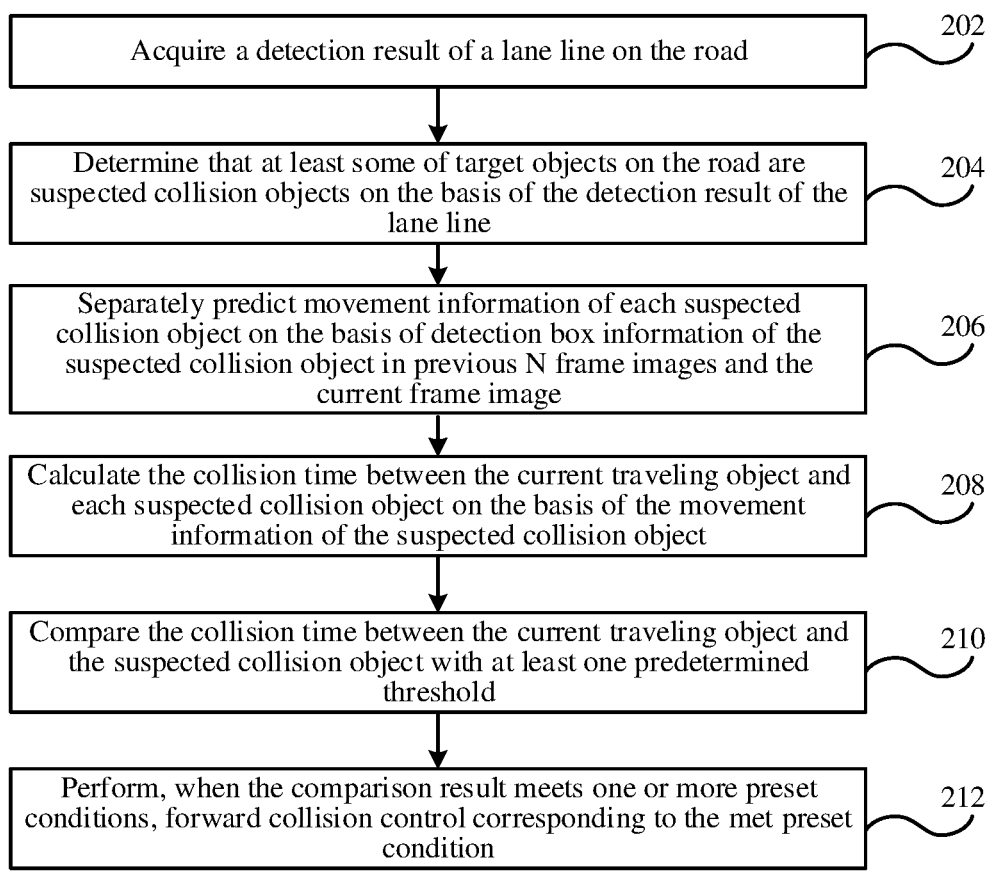
FIG. 2 is a flowchart of another embodiment of a forward collision control method according to the present disclosure.

FIG. 2 is a flowchart of another embodiment of a forward collision control method according to the present disclosure. As shown in FIG. 2, the forward collision control method according to this embodiment includes the following operations.

At 202, a detection result of a lane line on the road is acquired.

In an optional example, the operation 202 may be executed by a processor by invoking a corresponding instruction stored in a memory, or may be executed by a first detection module or an acquiring unit therein run by the processor.

At 204, at least some of target objects on the road are determined as suspected collision objects on the basis of the detection result of the lane line.

In an optional example, the operation 204 may be executed by a processor by invoking a corresponding instruction stored in a memory, or may be executed by a first detection module or a determination unit therein run by the processor.

At 206, movement information of each suspected collision object is separately predicted on the basis of detection box information of the suspected collision object in previous N frame images and the current frame image, where the movement information includes: the position, the movement speed, and the movement acceleration.

In an optional example, the operation 206 may be executed by a processor by invoking a corresponding instruction stored in a memory, or may be executed by a first prediction module or a prediction unit therein run by the processor.

At 208, the collision time between the current traveling object and each suspected collision object is calculated on the basis of the movement information of the suspected collision object.

In some implementation methods, detection box information and movement information of each suspected collision object in the current frame image can be converted from a camera coordinate system into a world coordinate system, and then the collision time between the current traveling object and the suspected collision object is calculated. For example, when a lane line is detected, a target object in the lane where the current traveling object is located can be determined as a suspected collision object, detection box information and movement information of each suspected collision object are converted from a camera coordinate system into a world coordinate system, and then the collision time between the current traveling object and the suspected collision object is calculated. When no lane line is detected, detection box information and movement information of target objects in the current frame image can be converted from a camera coordinate system into a world coordinate system, and then a target object having the distance from the current traveling object within a preset range (e.g. five meters) is filtered as a suspected collision object, and the collision time between the current traveling object and each suspected collision object is calculated.

In an optional example, the operation 208 may be executed by a processor by invoking a corresponding instruction stored in a memory, or may be executed by a first prediction module or a calculation unit therein run by the processor.

At 210, the collision time between the current traveling object and the suspected collision object is compared with at least one predetermined threshold.

In an optional example, the operation 210 may be executed by a processor by invoking a corresponding instruction stored in a memory, or may be executed by a control module or a comparison unit therein run by the processor.

At 212, when the comparison result meets one or more preset conditions, forward collision control corresponding to the met preset condition is performed, where the forward collision control, for example, may include, but is not limited to: forward collision warning and/or driving control.

In an optional example, the operation 212 may be executed by a processor by invoking a corresponding instruction stored in a memory, or may be executed by a control module or a control unit therein run by the processor.

According to the embodiments of the present disclosure, movement information of each suspected collision object is predicted on the basis of detection box information of the suspected collision object in previous N frame images and the current frame image, and the collision time between the current traveling object and each suspected collision object is calculated on the basis of the movement information of the suspected collision object, which improves the accuracy and the precision of the collision time and facilitates further improving the precision of the collision control.

A target object in the current frame image is detected by using the neural network to obtain a detection box of the target object in the current frame image; an object box of the target object in the current frame image is predicted on the basis of the detection box of the target object in the previous N frame images, where the previous N frame images include N frame images located before the current frame image and arranged by the image acquisition order; detection box information of the target object in the current frame image is determined according to the detection box and the object box of the target object; the collision warning is performed on the basis of the detection box information. According to the embodiments of the present disclosure, target objects (e.g. a vehicle, pedestrian, and a non-motorized vehicle) are detected by utilizing deep learning, which improves the accuracy and the precision of the detection result, and the dynamic detection and the tracking matching of a target object are implemented by utilizing deep learning so that the detection result of the target object is more accurate and stable, missed detection can be avoided, and the accuracy of the detection result is further improved, thereby facilitating reducing road traffic events.

In some implementation methods, when multiple preset conditions are included, forward collision control degrees respectively corresponding to the multiple preset conditions can be increased gradually. In the embodiments, forward collision control degrees respectively corresponding to multiple preset conditions are increased gradually. Corresponding forward collision control means can be taken to perform forward collision warning and/or driving control on the current traveling object according to different collision time between the current traveling object and suspected collision objects so as to implement a better forward collision control effect.

In some implementation methods, the performing, when the comparison result meets one or more preset conditions, forward collision warning corresponding to the met preset condition may include: performing collision warning if the collision time between a suspected collision object and the current traveling object is less than or equal to a second preset threshold and greater than a first preset threshold, where values of the first preset threshold and the second preset threshold are greater than zero, separately, and the first preset threshold is less than the second preset threshold, for example, values of the first preset threshold and the second preset threshold are three seconds and five seconds, separately.

For example, for a first suspected collision object having the collision time less than or equal to the second preset threshold and greater than the first preset threshold, whether the first suspected collision object trends to be distant from a collision region is predicted on the basis of movement information of the first suspected collision object; if the first suspected collision object does not trend to be distant from the collision region, the collision warning is performed by means of a collision alert, where the collision alert, for example, may be a collision prompt, e.g. a prompt of the existence of pedestrian, an obstruction, etc. X meters ahead; if the first suspected collision object trends to be distant from the collision region, the collision warning is not performed.

In another implementation methods, the performing, when the comparison result meets one or more preset conditions, forward collision warning corresponding to the met preset condition may include: performing collision warning and/or driving control if the collision time between a suspected collision object and the current traveling object is less than or equal to a first preset threshold, where the driving control, for example, may include, but is not limited to any one or more of: braking deceleration and changing a driving direction.

For example, for a second suspected collision object having the collision time less than or equal to the first preset threshold, whether the second suspected collision object trends to be distant from a collision region is predicted on the basis of movement information of the second suspected collision object; if the second suspected collision object does not trend to be distant from the collision region, the collision warning and/or driving control is performed by means of a collision alert, where the driving control, for example, may include, but is not limited to any one or more of: braking deceleration and changing a driving direction, and the collision alert, for example, may be subjected to a collision alarm by means of sound, light, electricity, etc.; if the second suspected collision object trends to be distant from the collision region, the collision warning and/or driving control is not performed, where the driving control includes but is not limited to any one or more of: braking deceleration and changing a driving direction.

In the implementation methods, when a preset condition that the collision time is less than or equal to a second preset threshold and greater than a first preset threshold and a preset condition that the collision time is less than or equal to a first preset threshold are met, forward collision control degrees respectively corresponding to the preset conditions are increased gradually. When a preset condition that the collision time is less than or equal to a second preset threshold and greater than a first preset threshold is met, the collision prompt is made. When a preset condition that the collision time is less than or equal to a first preset threshold is met, the collision warning and/or driving control is performed to avoid the forward collision.

In addition, the forward collision control method according to any one of the embodiments of the present disclosure may further include an operation of determining detection box information of a target object in the current frame image, where the target object includes a suspected collision object in any one of the embodiments. For example, detection box information of a target object in the current frame image can be determined by the following approaches: detecting a target object in the current frame image by using the neural network to obtain a detection box of the target object in the current frame image; predicting an object box of the target object in the current frame image on the basis of detection boxes of the target object in previous N frame images, where the previous N frame images include N frame images located before the current frame image and arranged by the image acquisition order, and N is an integer greater than zero; and determining detection box information of the target object in the current frame image according to the detection box and the object box of the target object.

In an actual application, quality problems such as an unclear acquired frame image and problems such as the movement of a target object may cause shaking and losing of detection boxes of the same target object on different frame images to some extent if only the detection result of the current frame image is considered during the detection of the target object in the current frame image by using the neural network. In order to solve the problems, according to the embodiments, a target tracking algorithm is used for tracking target objects in consecutive frame images. When determining detection box information of a target object in the current frame image, an object box of the target object in the current frame image is predicted on the basis of a detection box of the target object in previous N frame images, and the detection box information of the target object in the current frame image is determined according to the detection box and the object box of the target object so that the dynamic detection of a destination object is implemented and the detection result (i.e., the detection box information) of the target object in the current frame image is more stable and accurate, thereby improving the accuracy of the collision warning.

Figure 3:
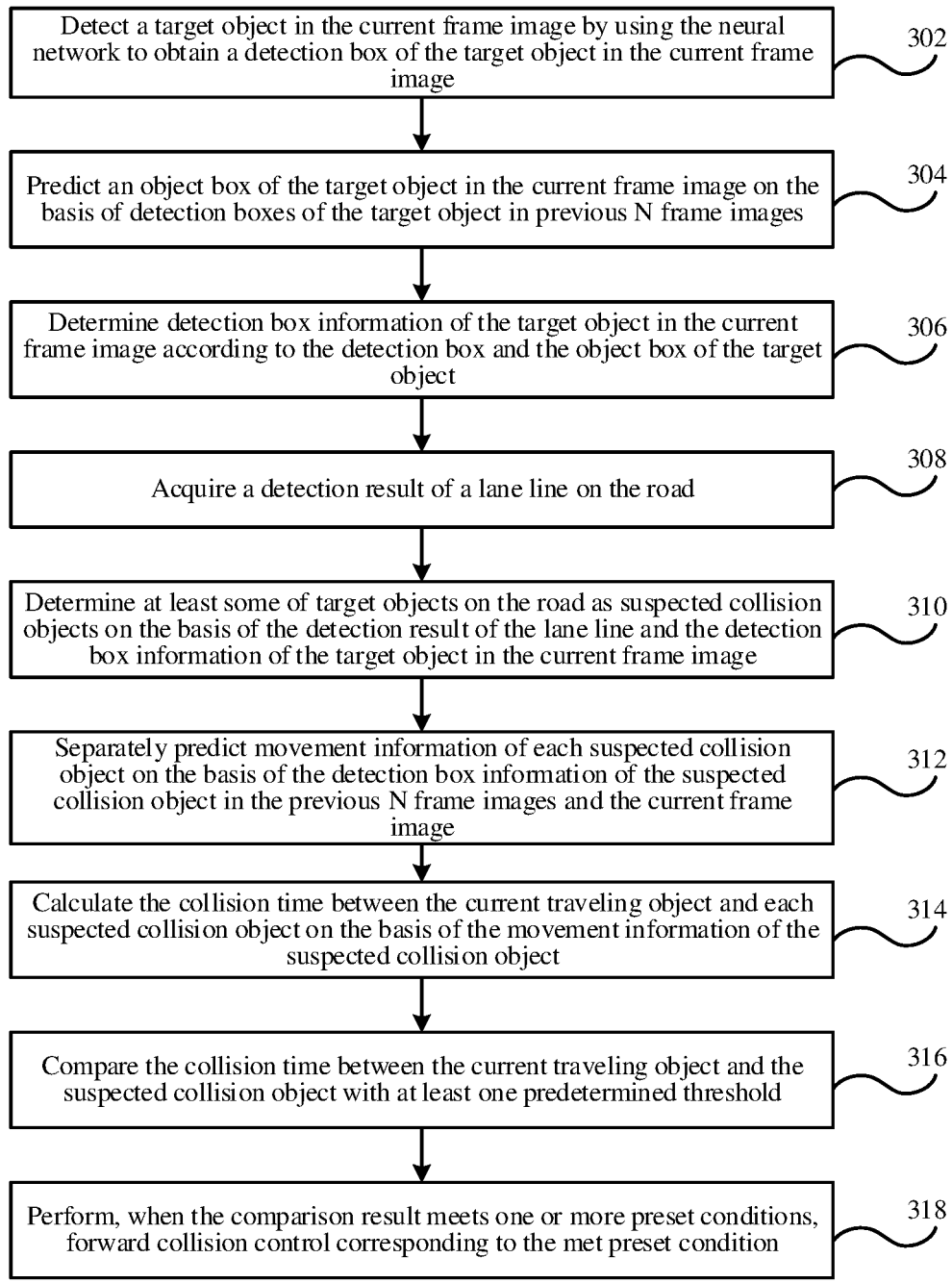
FIG. 3 is a flowchart of yet another embodiment of a forward collision control method according to the present disclosure.

FIG. 3 is a flowchart of yet another embodiment of a forward collision control method according to the present disclosure. As shown in FIG. 3, the forward collision control method according to this embodiment includes the following operations.

At 302, a target object in the current frame image is detected by using the neural network to obtain a detection box of the target object in the current frame image.

In an optional example, the operation 302 may be executed by a processor by invoking a corresponding instruction stored in a memory, or may be executed by a second detection module run by the processor.

At 304, an object box of the target object in the current frame image is predicted on the basis of detection boxes of the target object in previous N frame images.

The previous N frame images include N frame images located before the current frame image and arranged by the image acquisition order, and N is an integer greater than zero.

In an optional example, the operation 304 may be executed by a processor by invoking a corresponding instruction stored in a memory, or may be executed by a second prediction module run by the processor.

At 306, detection box information of the target object in the current frame image is determined according to the detection box and the object box of the target object.

In an optional example, the operation 306 may be performed by a processor by invoking a corresponding instruction stored in a memory, and may also be performed by a determination module run by the processor.

At 308, a detection result of a lane line on the road is acquired.

In an optional example, the operation 308 may be executed by a processor by invoking a corresponding instruction stored in a memory, or may be executed by a first detection module or an acquiring unit therein run by the processor.

At 310, at least some of target objects on the road are determined as suspected collision objects on the basis of the detection result of the lane line and the detection box information of the target object in the current frame image.

If the detection result of the lane line is detected lane line information, a target object in the lane where the current traveling object is located is selected as a suspected collision object according to the lane line information and the detection box information of target objects in the current frame image. If the detection result of the lane line is that no lane line is detected, a target object having the distance from the current traveling object within a preset range is selected as a suspected collision object according to the detection box information of target objects in the current frame image.

In an optional example, the operation 310 may be executed by a processor by invoking a corresponding instruction stored in a memory, or may be executed by a first detection module or a determination unit therein run by the processor.

At 312, movement information of each suspected collision object is separately predicted on the basis of the detection box information of the suspected collision object in the previous N frame images and the current frame image.

In an optional example, the operation 312 may be executed by a processor by invoking a corresponding instruction stored in a memory, or may be executed by a first prediction module or a prediction unit therein run by the processor.

At 314, the collision time between the current traveling object and each suspected collision object is calculated on the basis of the movement information of the suspected collision object.

In an optional example, the operation 314 may be executed by a processor by invoking a corresponding instruction stored in a memory, or may be executed by a first prediction module or a calculation unit therein run by the processor.

At 316, the collision time between the current traveling object and the suspected collision object is compared with at least one predetermined threshold.

In an optional example, the operation 316 may be executed by a processor by invoking a corresponding instruction stored in a memory, or may be executed by a control module or a comparison unit therein run by the processor.

At 318, when the comparison result meets one or more preset conditions, forward collision control corresponding to the met preset condition is performed, where the forward collision control, for example, may include, but is not limited to: forward collision warning and/or driving control.

In an optional example, the operation 318 may be executed by a processor by invoking a corresponding instruction stored in a memory, or may be executed by a control module or a control unit therein run by the processor.

According to the embodiments of the present disclosure, target objects (e.g. a vehicle, pedestrian, and a non-motorized vehicle) are detected by utilizing deep learning, which improves the accuracy and the precision of the detection result, and the dynamic detection and the tracking matching of a target object are implemented by utilizing deep learning so that the detection result of the target object is more accurate and stable, missed detection can be avoided, and the accuracy of the detection result is further improved, thereby improving the precision of the collision control and facilitating reducing road traffic events.

In an optional example of the embodiments of the present disclosure, detecting a target object in the current frame image by using the neural network to obtain a detection box of the target object in the current frame image may include: extracting a feature of the current frame image by using the neural network; and determining a detection box of the target object by using the neural network on the basis of the extracted feature.

In the field of assistant driving, the detection of target objects (e.g. a target substance) relates to modeling the physical characteristic of the target objects by utilizing a deep learning network, and determining the scene in the natural scene where the target object possibly appears by means of the established deep learning model (which can also be called as: a feature extraction unit). In some optional examples of the embodiments, firstly, a feature of the current frame image is extracted by using a deep learning model in a neural network, and then candidate boxes which possibly include target objects in the current frame image are calculated by using an extractor in a candidate region according to the extracted feature, each candidate box is scored by using a target object classifier, and the candidate box having the highest score is used as a detection box of the target object for outputting. According to the embodiments, destination objects (e.g. a vehicle, pedestrian, a non-motorized vehicle, and an obstruction) are detected by using a deep learning network so as to improve the detection precision of the destination objects, thereby improving the accuracy of the detection result.

In some optional examples, a neural network may include multiple feature layers located at different network depth, respectively. Therefore, extracting a feature of the current frame image by using the neural network may include:

sequentially performing feature extraction on the current frame image input to the neural network by means of feature layers of the neural network, and performing feature fusion on a first feature which is output by a first feature layer having a network depth of i and a second feature which is output by a second feature layer having a network depth of j to obtain a fused feature as an input feature of a third feature layer having a network depth of j+1 or the feature of the current frame image output by the neural network, where $1 \leq i < j$, and i and j are integers.

In order to make a neural network have strong robustness on the illumination and the shielding, and the distance, the size, the road condition, the deformation, etc. of a target object, a multi-size network structure connected across the layer is proposed in the embodiments. A deep learning model (i.e., a feature extraction unit in the neural network) includes multiple feature layers located at different network depth, respectively. In a network depth direction, inputs of any one of feature layers except for the first feature layer in the network depth direction are outputs of the previous feature layers. Therefore, levels of abstraction of information extracted for the feature layers are different with the deepening of the network depth. Features extracted by a feature layer having a shallow network depth are generally specific details such as the edge, the color, and the brightness of an object, and features extracted by a feature layer having a deep network depth are generally more abstract, for example, the deformation and the attribute (e.g. the model and the size of a vehicle) of an object. According to the network structure connected across the layer in the embodiments, features output by feature layers at different network depth are performed feature fusion to obtain a fused feature, and then the next feature extraction or output is performed. Features finally extracted in a neural network can integrate information at different levels by means of feature fusion so that the neural network can efficiently deal with different situations in the natural scene.

In some optional examples, determining the detection box of the target object by using the neural network on the basis of the extracted feature includes:

determining candidate boxes including target objects by using the neural network on the basis of the extracted feature;

separately classifying the candidate boxes by using the neural network on the basis of features of the candidate boxes to obtain probability scores that the candidate boxes belong to different types of target objects, separately;

separately using the types corresponding to the maximum probability scores in the probability scores of the candidate boxes as the types of target objects in the candidate boxes, where the type of the target object, for example, may include, but is not limited to: a vehicle, pedestrian, a non-motorized vehicle, a building, etc.; and separately selecting candidate boxes having an overlapping rate greater than a preset threshold and having the same type of target objects (the type corresponding to the maximum probability score) as a group of candidate boxes, selecting, from a group of candidate boxes, a candidate box corresponding to the maximum probability score of the type of the target object (i.e., the probability that the candidate box is determined as the type of the corresponding target object is the maximum) as a detection box of the target object, and suppressing other candidate boxes in the group of candidate boxes.

According to the embodiments, after candidate boxes including target objects are determined, the conditions that the candidate boxes include each other or multiple candidate boxes overlap with each other may exist. The candidate boxes are separately classified on the basis of features of the candidate boxes to obtain probability scores that the candidate boxes belong to different types of target objects, separately; candidate boxes having an overlapping rate greater than a preset threshold and having the same type of target objects are selected as a group of candidate boxes; a candidate box corresponding to the maximum probability score of the type of the target object is selected from a group of candidate boxes as a detection box of the target object, and other candidate boxes in the group of candidate boxes are suppressed; redundant candidate boxes are eliminated by means of Non-Maximum Suppression (NMS) to locate the position of the detection box of the optimal target object.

In some implementation methods of the embodiments of the present disclosure, detecting a target object in the current frame image by using the neural network includes:

detecting a target object in the current frame image by using the neural network if the current frame image is a first frame image in a frame sequence, where the frame sequence includes: M frame images arranged by the image acquisition order, and M is an integer greater than one; and/or regressing a detection box of a target object in the current frame image on the basis of detection box information of the first frame image in the frame sequence if the current frame image is not the first frame image in the frame sequence.

In some optional examples, regressing a detection box of a target object in the current frame image on the basis of detection box information of the first frame image in the frame sequence includes:

taking a center point of a detection box determined according to detection box information in the first frame image as a center point on the basis of the detection box information in the first frame image, and capturing, in the current frame image, a regional image having a length and/or width correspondingly greater than the length and/or width of the determined detection box, for example, capturing, in the current frame image, a regional image having a length and/or width twice as the length and/or width of the determined detection box, separately;

detecting the target object in the regional image by using the neural network to obtain the detection box of the target object in the regional image; and determining the detection box information of the target object in the current frame image according to the detection box of the target object in the regional image and the position of the regional image in the current frame image.

According to the embodiments, when target object detection is required to be performed on a frame image in a video, the video can be divided into multiple frame sequences in advance or is divided into a frame sequence temporarily. For example, the first to fifth frame images and the sixth to ninth frame images can be divided as a frame sequence, separately. For a frame sequence including the first to fifth frame images, target object detection can be performed only on the first frame image, and detection boxes of the same target object in the second to fifth frame images are regressed on the basis of detection box information of a destination object in the first frame image. For a frame sequence including the sixth to ninth frame images, target object detection can be performed only on the sixth frame image, and detection boxes of the same target object in the seventh to ninth frame images are regressed on the basis of detection box information of a destination object in the sixth frame image; etc.

According to the embodiments, detection boxes of the same target object in subsequent frame images in a frame sequence are regressed according to detection box information of a first frame image in the frame sequence. Since a regional image is less than an original frame image, the target detection range is narrowed compared with the detection in the whole frame image range, the detection time is saved, the detection boxes of the same target object in subsequent frame images in the frame sequence can be detected more quickly, and the detection effect and the accuracy of the detection result are improved.

In some optional examples, predicting an object box of the target object in the current frame image on the basis of detection boxes of the target object in previous N frame images includes: for the same target object in the previous N frame images, fitting the speed and the acceleration of changes in the sizes and positions of the detection boxes of the same target object in the previous N frame images according to the sizes and the positions of the detection boxes of the same target object in the previous N frame images; and predicting the size and the position of an object box of the same target object in the current frame image according to the speed and the acceleration of changes in the sizes and positions of the detection boxes of the same target object in the previous N frame images.

According to the embodiments of the present disclosure, for example, a single target tracking algorithm and/or multi-target tracking algorithm is used for performing target tracking on the target objects in the previous N frame images to obtain detection boxes of the target objects in the previous N frame images, separately. Meanwhile, the single target tracking algorithm and the multi-target tracking algorithm are used for performing target tracking on the target objects in the previous N frame images, which makes the obtained target tracking result more stable.

In an actual application, quality problems such as an unclear acquired frame image and problems such as the movement of a target object may cause shaking and losing of detection boxes of the same target object on different frame images to some extent if only the detection result of the current frame image is considered during the detection of the target object in the current frame image by using the neural network. In order to solve the problems, according to the embodiments, a target tracking algorithm is used for tracking target objects in consecutive frame images. When determining detection box information of a target object in the current frame image, the detection box information of the target object in the current frame image is determined according to the size and the position of the detection box of the target object in the current frame image detected by using the neural network and in combination with the size and the position of an object box in the current frame image obtained by means of prediction according to the speed and the acceleration of changes in the sizes and positions of the detection boxes of the same target object in previous N frame images so that the dynamic detection of the target object is implemented and the detection result (i.e., the detection box information) of the target object in the current frame image is more stable and accurate, thereby improving the accuracy of the collision warning.

In some implementation methods, determining detection box information of the target object in the current frame image according to the detection box and the object box of the target object may include:

acquiring, for a first target object in the target objects which has an overlapping rate between the detection box and the object box equal to or greater than a preset threshold, average values of the detection box and the object box of the first target object in terms of the size and the position as the detection box information of the first target object in the current frame image, where the detection box information includes: the size and the position of the detection box.

According to the embodiments, smoothing of detection boxes of the same target object in multiple frame images is implemented, i.e., smoothing of the positions and the sizes of two-dimensional detection boxes of the same target object is implemented so that the detection result of the target object is more stable.

In further implementation methods, determining detection box information of the target object in the current frame image according to the detection box and the object box of the target object may further include:

for a second target object in the target objects which has an overlapping rate between the detection box and the object box less than a preset threshold, taking a predicted size and position of the object box of the second target object as the detection box information of the second target object in the current frame image.

In further implementation methods, determining detection box information of the target object in the current frame image according to the detection box and the object box of the target object may further include:

for a third target object in the target objects which does not have a detection box corresponding to the object box in the current frame image, i.e., target objects, in which the third target object has a detection box in previous N frame images, which are not detected in the current frame image, taking a predicted size and position of the object box of the third target object as the detection box information of the third target object in the current frame image.

A center point of a two-dimensional detection box represents position information, and a length/width of a two-dimensional detection box represents the change in size of a target object. According to the embodiments of the present disclosure, the deserved size of a detection box of the target object in the current frame image is predicted by fitting the speed and the acceleration of the change in the length/width of the two-dimensional detection box of the same target object in a historical frame image, and the deserved position of the detection box of the target object in the current frame image is predicted by fitting the speed and the acceleration of the change in the position of the two-dimensional detection box of the same target object in a historical frame image. If the directly detected detection box of the same target object in the current frame image basically overlaps with the object box obtained by means of prediction on the basis of the historical frame image (an overlapping rate reaches a preset threshold), the average value between the detection box and the object box is used as the final detection box information so that the detection result is more stable. If an overlapping rate between the directly detected detection box of the same target object in the current frame image and the object box obtained by means of prediction on the basis of the historical frame image is less than a preset threshold, the object box obtained by means of prediction on the basis of the historical frame image is used as the final detection box information so that the detection result is more stable. If the same target object is not detected on the current frame image, the object box obtained by means of prediction on the basis of the historical frame image is used as the detection box information of the destination object in the current frame image so as to avoid missed detection of the target object. According to the embodiments, detection box information of a target object in the current frame image is determined on the basis of the continuity of frame images in the same video in timing, by comprehensively utilizing the size and the position of the detection box of the target object in the current frame image detected by using the neural network, and in combination with the size and the position of an object box in the current frame image obtained by means of prediction according to the speed and the acceleration of changes in the sizes and positions of the detection boxes of the same target object in previous N frame images so that smoothing and insertion of the detection boxes of the same target object in multiple frame images and the dynamic detection of the destination object are implemented, and the detection result of the target object in the current frame image is more stable and accurate, thereby improving the accuracy of the collision warning.

In some implementation methods of the embodiments of the present disclosure, when the suspected collision object is a person or robot, separately predicting movement information of each suspected collision object on the basis of detection box information of the suspected collision object in previous N frame images and the current frame image may include:

using the neural network to predict behaviors of persons or robots on the basis of detection box information in the current frame image to obtain predicted behavior information of the persons or the robots in the current frame image, where the predicted behavior information includes: the movement direction, the movement state, and action classification information; and separately determining movement information of the persons or the robots on the basis of the predicted behavior information of the persons or the robots and the detection box information of the persons or the robots in the previous N frame images and the current frame image.

In some optional examples, predicting behaviors of persons or robots on the basis of detection box information in the current frame image to obtain predicted behavior information of the persons or the robots in the current frame image includes:

performing key point detection on a corresponding person or robot on the basis of the detection box information in the current frame image, acquiring the head direction and the body direction of the corresponding person or robot on the basis of the key point detection result, and acquiring the movement direction of the corresponding person or robot on the basis of the head direction and the body direction of the corresponding person or robot; classifying actions of the corresponding person or robot on the basis of the key point detection result to obtain action classification information of the corresponding person; and classifying the movement state of the corresponding person or robot on the basis of the key point detection result to obtain movement state information of the corresponding person or robot.

In some optional examples, the neural network, for example, may use an hourglass-type network structure to perform key point detection on a person or robot, and the head direction and the body direction of the person or robot can be determined on the basis of the key point obtained by means of detection so as to analyze the movement direction of the person or robot.

In some optional examples, the neural network may use a GoogleNet network to classify actions of a person or robot on the basis of the key point obtained by means of detection to obtain action classification information of the person or robot, where the action classification information, for example, may include: whether to make a call, whether to use a cell phone, whether to use an umbrella, etc.

In some optional examples, a neural network may use a GoogleNet network to classify the movement state of a person or robot on the basis of the key point obtained by means of detection to obtain movement state information of the person or robot, where the movement state information, for example, may include: walking, running, stopping, etc.

According to the embodiments, predicted behavior information of persons or robots in the current frame image can be predicted, for example, the movement direction, the action classification, the movement state, etc. so that movement information of persons or robots is determined on the basis of the predicted behavior information of the persons or robots and detection box information thereof in previous N frame images and the current frame image, where the movement information includes: the position, the movement speed, and the movement acceleration, for the subsequent forward collision warning and/or driving control. A deep learning architecture-based neural network is used for predicting behaviors of target objects so that the behavior prediction result is more accurate.

Any forward collision control method provided by the embodiments of the present disclosure may be executed by any appropriate device having data processing capability, including, but not limited to, a terminal device and a server, etc. Alternatively, any forward collision control method provided in the embodiments of the present disclosure may be executed by a processor, for example, any forward collision control method mentioned in the embodiments of the present disclosure is executed by the processor by invoking corresponding instructions stored in a memory. Details are not described below again.

A person of ordinary skill in the art may understand that: all or some operations for implementing the foregoing method embodiments are achieved by related hardware instructed by a program; the foregoing program may be stored in a computer readable storage medium; and when the program is executed, the operations including the foregoing method embodiments are executed. Moreover, the foregoing storage medium includes various media capable of storing program codes, such as a ROM, a RAM, a magnetic disk, or an optical disk.

Figure 4:
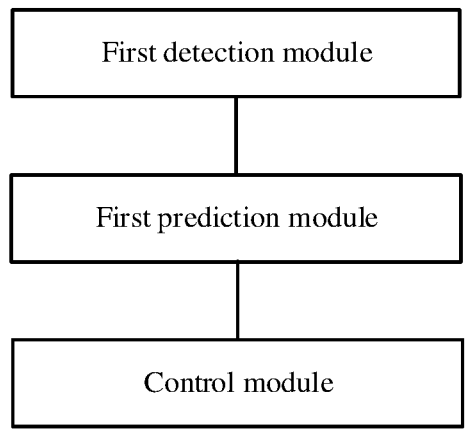
FIG. 4 is a schematic structural diagram of an embodiment of a forward collision control apparatus according to the present disclosure.

FIG. 4 is a schematic structural diagram of an embodiment of a forward collision control apparatus according to the present disclosure. The forward collision control apparatus according to the embodiments can be used for implementing the forward collision control method embodiment according to any one of the embodiments of the present disclosure. As shown in FIG. 4, the forward collision control apparatus according to the embodiments includes: a first detection module, a first prediction module, and a control module, where the first detection module is configured to detect a forward suspected collision object on a road where a current traveling object is located on the basis of a neural network.

In some implementation methods of the embodiments of the present disclosure, the type of the current traveling object, for example, may include, but is not limited to: a vehicle, a robot, etc. The type of a suspected collision object, for example, may include, but is not limited to any one or more of: a person, a vehicle, a non-motorized vehicle, a robot, an obstruction, etc. The vehicle, for example, may be any traveling objects such as an automobile, an electric vehicle, and a toy vehicle.

The first prediction module is configured to predict the collision time between the current traveling object and a suspected collision object.

The control module is configured to perform forward collision control on the current traveling object according to the collision time, where the forward collision control includes forward collision warning and/or driving control.

The driving control according to the embodiments of the present disclosure refers to a control action for changing the movement state and/or movement direction of the current traveling object, for example, may include: control actions that can change the movement direction and/or movement state of the current traveling object, including accelerating, braking deceleration, changing a driving direction of the current traveling object and the like. For example, in an actual application scene, if the original movement direction of the current vehicle is keeping straight in the lane, and the current vehicle collides with a suspected collision object ahead on the basis of the collision time, the driving direction of the current vehicle can be changed by means of driving control so that the current vehicle changes the lane to avoid the collision. If the suspected collision object ahead accelerates to drive away in the process, the driving direction of the current vehicle can be changed by means of driving control so that the current vehicle maintains the original movement direction and keeps straight in the lane.

According to the forward collision control apparatus provided in the embodiments of the present disclosure, a forward suspected collision object on a road where a current traveling object is located is detected on the basis of a neural network, and suspected collision objects (e.g. a vehicle, pedestrian, a non-motorized vehicle, a robot, and an obstruction) are detected by utilizing deep learning to improve the accuracy and the precision of the detection result; the collision time between the current traveling object and the suspected collision object is predicted, and forward collision control is performed on the current traveling object according to the collision time, where the forward collision control includes forward collision warning and/or driving control, thereby performing forward collision warning and/or driving control on the current traveling object, improving the precision of forward collision warning and driving control, and facilitating reducing road traffic events.

In some implementation methods, a first detection module includes: an acquiring unit, configured to acquire a detection result of a lane line on the road; and a determination unit, configured to determine at least some of target objects on the road as suspected collision objects on the basis of the detection result of the lane line.

In some optional examples, an acquiring unit is configured to: detect a lane line on the road on the basis of the neural network to obtain the detection result of the lane line; or acquire the detection result of the lane line from an advanced driver assistance system.

In some optional examples, a determination unit is configured to: select, if the detection result of a lane line is detected lane line information, at least some of target objects in the lane where the current traveling object is located as suspected collision objects according to the lane line information.

Alternatively, in another optional examples, a determination unit is configured to select a target object having the distance from the current traveling object within a preset range as a suspected collision object if the detection result of a lane line is that no lane line is detected.

In some implementation methods, a first detection module includes: a prediction unit, configured to separately predict movement information of each suspected collision object on the basis of detection box information of the suspected collision object in previous N frame images and the current frame image, where the movement information includes: the position, the movement speed, and the movement acceleration; and a calculation unit, configured to calculate the collision time between the current traveling object and each suspected collision object on the basis of the movement information of the suspected collision object.

In some implementation methods, a control module includes: a comparison unit, configured to compare the collision time between the current traveling object and a suspected collision object with at least one predetermined threshold; and a control unit, configured to perform, when the comparison result meets one or more preset conditions, forward collision control corresponding to the met preset condition.

When multiple preset conditions are included, forward collision control degrees respectively corresponding to the multiple preset conditions can be increased gradually.

Figure 5:
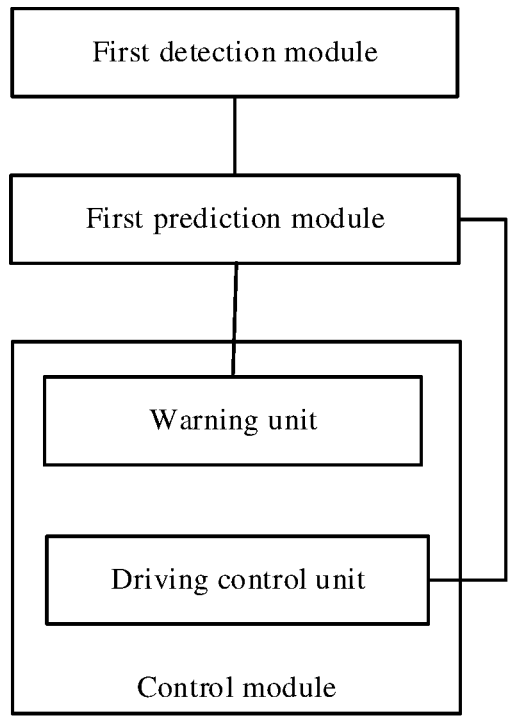
FIG. 5 is a schematic structural diagram of another embodiment of a forward collision control apparatus according to the present disclosure.

FIG. 5 is a schematic structural diagram of another embodiment of a forward collision control apparatus according to the present disclosure. As shown in FIG. 5, in some embodiments, a control unit may include: a warning unit and/or driving control unit, where the warning unit is configured to perform forward collision warning on the current traveling object according to the collision time; and the driving control unit is configured to perform driving control on the current traveling object according to the collision time.

In some implementation methods, a warning unit is configured to perform collision warning if the collision time between a suspected collision object and the current traveling object is less than or equal to a second preset threshold and greater than a first preset threshold, where the first preset threshold is less than the second preset threshold.

In some optional examples, a warning unit is configured to predict, for a first suspected collision object having the collision time less than or equal to the second preset threshold and greater than the first preset threshold, whether the first suspected collision object trends to be distant from a collision region on the basis of movement information of the first suspected collision object; and perform collision warning if the first suspected collision object does not trend to be distant from the collision region. Alternatively, the warning unit is further configured: not to perform collision warning if the first suspected collision object trends to be distant from the collision region.

In some implementation methods, a warning unit is further configured to perform collision warning and/or driving control if the collision time between a suspected collision object and the current traveling object is less than or equal to a first preset threshold, where the driving control includes any one or more of: braking deceleration and changing a driving direction.

In some optional examples, a warning unit is configured to predict, for a second suspected collision object having the collision time less than or equal to the first preset threshold, whether a second suspected collision object trends to be distant from a collision region on the basis of movement information of the second suspected collision object; and perform collision warning and/or driving control if the second suspected collision object does not trend to be distant from the collision region, where the driving control includes any one or more of: braking deceleration and changing a driving direction. Alternatively, the warning unit is further configured: not to perform collision warning and/or driving control if the second suspected collision object trends to be distant from the collision region, where the driving control includes any one or more of: braking deceleration and changing a driving direction.

Figure 6:
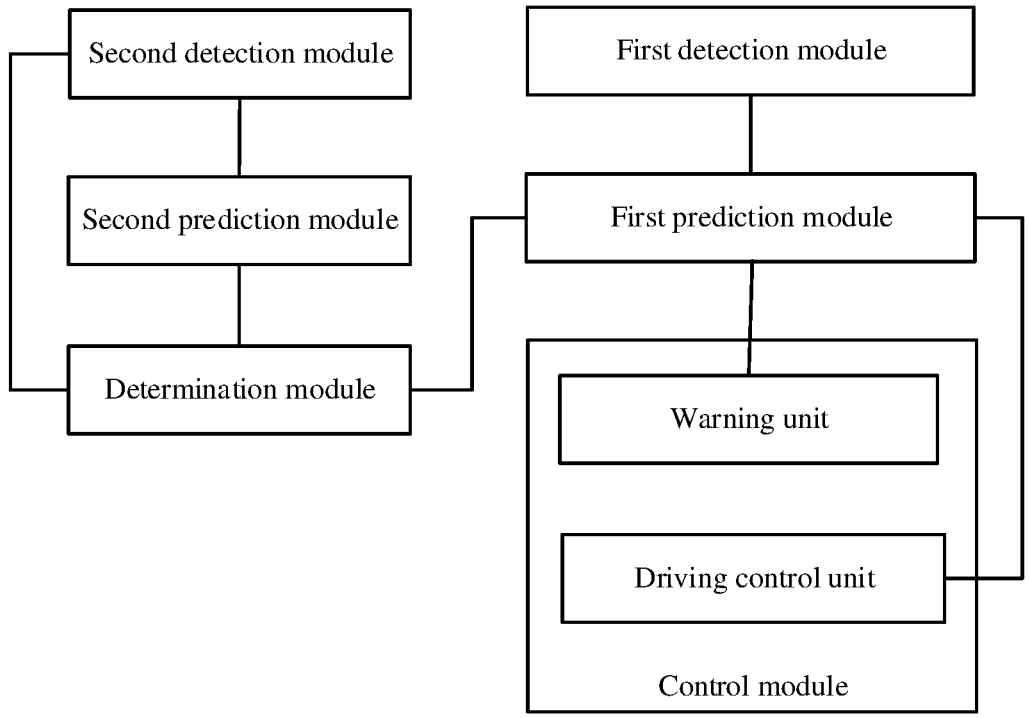
FIG. 6 is a schematic structural diagram of yet another embodiment of a forward collision control apparatus according to the present disclosure.

FIG. 6 is a schematic structural diagram of yet another embodiment of a forward collision control apparatus according to the present disclosure. As shown in FIG. 6, compared with the forward collision control apparatus according to any one of the embodiments of the present disclosure, the forward collision control apparatus according to the embodiments further includes: a second detection module, a second prediction module, and a determination module, where the second detection module is configured to detect a target object in the current frame image by using the neural network to obtain a detection box of the target object in the current frame image.

The second prediction module is configured to predict an object box of the target object in the current frame image on the basis of detection boxes of the target object in previous N frame images, where the previous N frame images include N frame images located before the current frame image and arranged by the image acquisition order, and N is an integer greater than zero.

The determination module is configured to determine detection box information of the target object in the current frame image according to the detection box and the object box of the target object.

In some implementation methods, a second detection module includes: a feature extraction unit, configured to extract a feature of the current frame image by using the neural network; and a determination unit, configured to determine a detection box of a target object on the basis of the extracted feature.

The neural network may include multiple feature layers located at different network depth, respectively. In some optional examples, a feature extraction unit is configured to: sequentially perform feature extraction on the current frame image input to the neural network by means of feature layers of the neural network, and perform feature fusion on a first feature which is output by a first feature layer having a network depth of i and a second feature which is output by a second feature layer having a network depth of j to obtain a fused feature as an input feature of a third feature layer having a network depth of j+1 or the feature of the current frame image output by the neural network, where $1 \leq i < j$, and i and j are integers.

In some optional examples, a determination unit is configured to: determine candidate boxes including target objects by using the neural network on the basis of the extracted feature; separately classify the candidate boxes by using the neural network on the basis of features of the candidate boxes to obtain probability scores that the candidate boxes belong to different types of target objects, separately; separately use the types corresponding to the maximum probability scores in the probability scores of the candidate boxes as the types of target objects in the candidate boxes; separately select candidate boxes having an overlapping rate greater than a preset threshold and having the same type of target objects as a group of candidate boxes; and select, from a group of candidate boxes, a candidate box corresponding to the maximum probability score of the type of the target object as a detection box of the target object.

In some implementation methods, a second detection module may include: a detection unit, configured to detect a target object in the current frame image by using the neural network if the current frame image is a first frame image in a frame sequence, where the frame sequence includes: M frame images arranged by the image acquisition order, and M is an integer greater than one; and/or a regression unit, configured to regress a detection box of a target object in the current frame image on the basis of detection box information of the first frame image in the frame sequence if the current frame image is not the first frame image in the frame sequence.

In some optional examples, a regression unit is configured to: take a center point of a detection box determined according to detection box information in a first frame image as a center point on the basis of the detection box information in the first frame image, and capture, in the current frame image, a regional image having a length and/or width correspondingly greater than the length and/or width of the determined detection box; detect a target object in the regional image by using the neural network to obtain the detection box of the target object in the regional image; and determine the detection box information of the target object in the current frame image according to the detection box of the target object in the regional image and the position of the regional image in the current frame image.

In some implementation methods, a second prediction module is configured to: for the same target object in previous N frame images, fit the speed and the acceleration of changes in the sizes and positions of detection boxes of the same target object in the previous N frame images according to the sizes and the positions of the detection boxes of the same target object in the previous N frame images; and predict the size and the position of an object box of the same target object in the current frame image according to the speed and the acceleration of changes in the sizes and positions of the detection boxes of the same target object in the previous N frame images.

In some optional examples, a determination module is configured to: acquire, for a first target object in the target objects which has an overlapping rate between the detection box and the object box equal to or greater than a preset threshold, average values of the detection box and the object box of the first target object in terms of the size and the position as detection box information of the first target object in the current frame image, where the detection box information includes: the size and the position of the detection box.

In some optional examples, a determination module is configured to: for a second target object in the target objects which has an overlapping rate between the detection box and the object box less than a preset threshold, taking a predicted size and position of the object box of the second target object as detection box information of the second target object in the current frame image.

In some optional examples, a determination module is configured to: for a third target object in the target objects which does not have a detection box corresponding to the object box in the current frame image, take a predicted size and position of the object box of the third target object as detection box information of the third target object in the current frame image.

In some optional examples, when the suspected collision objects are persons or robots, a prediction unit is configured to: use the neural network to predict behaviors of the persons or robots on the basis of detection box information in the current frame image to obtain predicted behavior information of the persons or the robots in the current frame image, where the predicted behavior information includes: the movement direction, the movement state, and action classification information; and separately determine movement information of the persons or the robots on the basis of the predicted behavior information of the persons or the robots and the detection box information of the persons or the robots in previous N frame images and the current frame image.

In some optional examples, when behaviors of persons or robots are predicted on the basis of detection box information in the current frame image to obtain predicted behavior information of the persons or the robots in the current frame image, a prediction unit is configured to:

perform key point detection on a corresponding person or robot on the basis of the detection box information in the current frame image, acquire the head direction and the body direction of the corresponding person or robot on the basis of the key point detection result, and acquire the movement direction of the corresponding person or robot on the basis of the head direction and the body direction of the corresponding person or robot; and classify actions of the corresponding person or robot on the basis of the key point detection result to obtain action classification information of the corresponding person; and classify the movement state of the corresponding person or robot on the basis of the key point detection result to obtain movement state information of the corresponding person or robot.

Embodiments of the present disclosure further provide an electronic device, including the forward collision control apparatus according to any of the foregoing embodiments of the present disclosure.

The embodiments of the present disclosure further provide another electronic device, including: a memory, configured to store executable instructions; and a processor, configured to communicate with the memory to execute the executable instructions so as to complete operations of the forward collision control method according to any one of the foregoing embodiments of the present disclosure.

Figure 7:
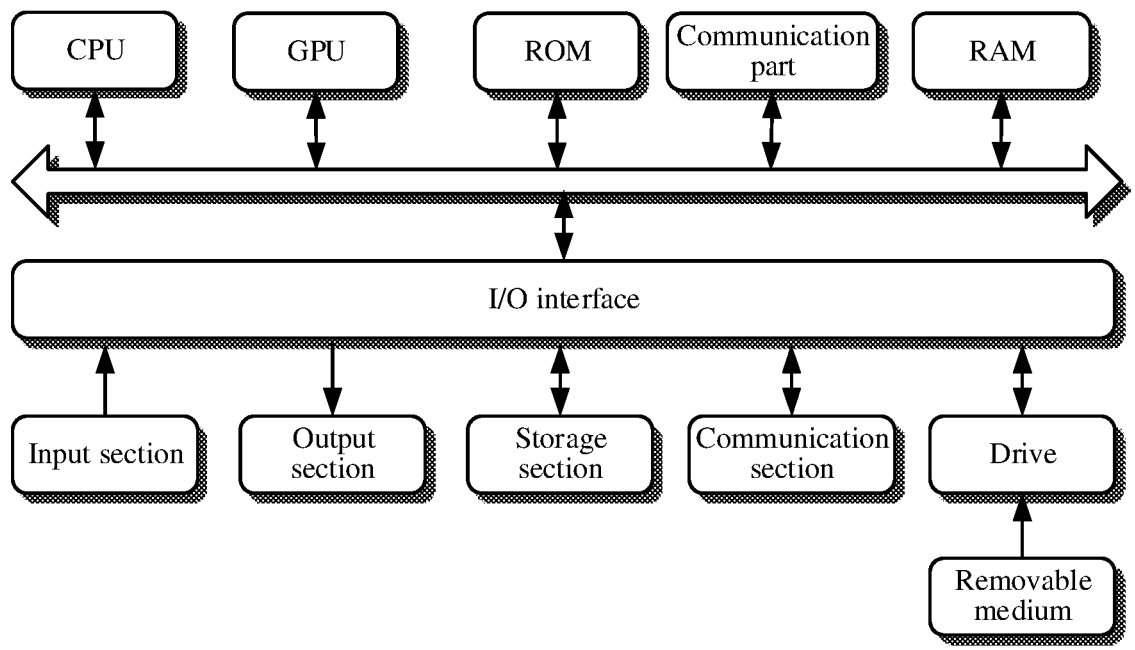
FIG. 7 is a schematic structural diagram of an application embodiment of an electronic device according to the present disclosure.

FIG. 7 is a schematic structural diagram of an application embodiment of an electronic device according to the present disclosure. Referring to FIG. 7 below, a schematic structural diagram of an electronic device, which may be a terminal device or a server, suitable for implementing the embodiments of the present disclosure is shown. As shown in FIG. 7, the electronic device includes one or more processors, a communication part, and the like. The one or more processors are, for example, one or more Central Processing Units (CPUs), and/or one or more Graphic Processing Units (GPUs), and the like. The processor may perform various appropriate actions and processing according to executable instructions stored in a Read-Only Memory (ROM) or executable instructions loaded from a storage section to a Random Access Memory (RAM). The communication part may include, but is not limited to, a network card. The network card may include, but is not limited to, an Infiniband (IB) network card. The processor may communicate with the ROM and/or the RAM, to execute executable instructions. The processor is connected to the communication part via a bus, and communicates with other target devices via the communication part, thereby implementing corresponding operations of any of the forward collision control methods provided in the embodiments of the present disclosure, for example, detecting a forward suspected collision object on a road where a current traveling object is located on the basis of a neural network; predicting the collision time between the current traveling object and a suspected collision object; and performing forward collision control on the current traveling object according to the collision time, where the forward collision control includes forward collision warning and/or driving control.

In addition, the RAM may further store various programs and data required for operations of an apparatus. The CPU, the ROM, and the RAM are connected to each other via the bus. In the presence of the RAM, the ROM is an optional module. The RAM stores executable instructions, or writes the executable instructions into the ROM during running, where the executable instructions cause the processor to execute corresponding operations of any forward collision control method of this disclosure. An input/output (I/O) interface is also connected to the bus. The communication part may be integrated, or may be configured to have a plurality of sub-modules (for example, a plurality of IB network cards) connected to the bus.

The following components are connected to the I/O interface: an input section including a keyboard, a mouse and the like; an output section including a Cathode-Ray Tube (CRT), a Liquid Crystal Display (LCD), a speaker and the like; the storage section including a hard disk and the like; and a communication section of a network interface card including an LAN card, a modem and the like. The communication part performs communication processing via a network such as the Internet. A drive is also connected to the I/O interface according to requirements. A removable medium such as a magnetic disk, an optical disk, a magneto-optical disk, a semiconductor memory or the like is mounted on the drive according to requirements, so that a computer program read from the removable medium may be installed on the storage section according to requirements.

It should be noted that the architecture illustrated in FIG. 7 is merely an optional implementation mode. During specific practice, the number and types of the components in FIG. 7 may be selected, decreased, increased, or replaced according to actual requirements. Different functional components may be separated or integrated or the like. For example, the GPU and the CPU may be separated, or the GPU may be integrated on the CPU, and the communication part may be separated from or integrated on the CPU or the GPU or the like. These alternative implementations all fall within the scope of protection of this disclosure.

In addition, embodiments of the present disclosure further provide a computer storage medium, configured to store computer-readable instructions. When the instructions are executed, the operations of the forward collision control method according to any one of the foregoing embodiments of the present disclosure are implemented.

In addition, the embodiments of the present disclosure further provide a computer program, including computer-readable instructions. When the computer-readable instructions run in a device, a processor in the device implements the forward collision control method according to any one of the foregoing embodiments of the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses of the present disclosure are implemented in many manners. For example, the methods and apparatuses of the present disclosure are implemented with software, hardware, firmware, or any combination of software, hardware, and firmware. Unless otherwise specially stated, the foregoing sequences of operations of the methods are merely for description, and are not intended to limit the operations of the methods of this disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for executing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

What is claimed is:

1. A forward collision control method, comprising:
   detecting, based on a neural network, a forward suspected collision object on a road where a current traveling object is located;
   respectively predicting, based on detection box information of the forward suspected collision object in previous N frame images and a current frame image, movement information of each suspected collision object;
   calculating, based on the movement information of each suspected collision object, a collision time between the current traveling object and each suspected collision object; and
   performing, according to the collision time, forward collision control on the current traveling object, wherein the forward collision control comprises at least one of forward collision warning or driving control.

2. The method according to claim 1, wherein the current traveling object comprises: a vehicle or robot;
   the forward suspected collision object comprises at least one of: a person, another vehicle, a non-motorized vehicle, another robot, or an obstruction; and
   the detecting, based on a neural network, a forward suspected collision object on a road where a current traveling object is located comprises:
   acquiring a detection result of a lane line on the road; and
   determining, based on the detection result of the lane line, at least some of target objects on the road as suspected collision objects.

3. The method according to claim 2, wherein the acquiring a detection result of a lane line on the road comprises:
   detecting, based on the neural network, the lane line on the road to obtain the detection result of the lane line; or
   acquiring the detection result of the lane line from an advanced driver-assistance system.

4. The method according to claim 2, wherein the determining, based on the detection result of the lane line, at least some of target objects on the road as suspected collision objects comprises:
   in response to the detection result of the lane line being detected lane line information, selecting, according to the detected lane line information, at least some of target objects in a lane where the current traveling object is located as the suspected collision objects; or
   wherein the determining, based on the detection result of the lane line, at least some of target objects on the road as suspected collision objects comprises:
   in response to the detection result of the lane line being that no lane line is detected, selecting a target object having a distance from the current traveling object within a preset range as a suspected collision object.

5. The method according to claim 1,
   wherein the performing, according to the collision time, forward collision control on the current traveling object comprises:
   comparing the collision time between the current traveling object and each suspected collision object with at least one predetermined threshold; and
   in response to a comparison result meeting one or more preset conditions, performing forward collision control corresponding to the met preset condition.

6. The method according to claim 5, wherein in response to multiple preset conditions being comprised in the one or more preset conditions, forward collision control degrees respectively corresponding to the multiple preset conditions are increased degree by degree.

7. The method according to claim 5, wherein the in response to a comparison result meeting one or more preset conditions, performing forward collision control corresponding to the met preset condition comprises:
  in response to the collision time between a suspected collision object and the current traveling object being less than or equal to a second preset threshold and greater than a first preset threshold, performing the forward collision warning, wherein the first preset threshold is less than the second preset threshold.

8. The method according to claim 7, wherein the in response to the collision time between a suspected collision object and the current traveling object being less than or equal to a second preset threshold and greater than a first preset threshold, performing the forward collision warning comprises:
  for a first suspected collision object having the collision time less than or equal to the second preset threshold and greater than the first preset threshold, predicting, based on movement information of the first suspected collision object, whether the first suspected collision object trends to be distant from a collision region; and
  in response to the first suspected collision object not trending to be distant from the collision region, performing the forward collision warning; or
wherein the in response to the collision time between a suspected collision object and the current traveling object being less than or equal to a second preset threshold and greater than a first preset threshold, performing the forward collision warning further comprises:
  in response to the first suspected collision object trending to be distant from the collision region, not performing the forward collision warning; and
wherein the in response to a comparison result meeting one or more preset conditions, performing forward collision control corresponding to the met preset condition further comprises:
  in response to the collision time between a suspected collision object and the current traveling object being less than or equal to the first preset threshold, performing at least one of the forward collision warning or the driving control, wherein the driving control comprises at least one of: braking deceleration or changing a driving direction.

9. The method according to claim 8, wherein the in response to the collision time between a suspected collision object and the current traveling object being less than or equal to the first preset threshold, performing at least one of collision warning or driving control comprises:
  for a second suspected collision object having the collision time less than or equal to the first preset threshold, predicting, based on movement information of the second suspected collision object, whether the second suspected collision object trends to be distant from a collision region; and
  in response to the second suspected collision object not trending to be distant from the collision region, performing at least one of collision warning or driving control, wherein the driving control comprises at least one of: braking deceleration or changing a driving direction; or
wherein the in response to the collision time between a suspected collision object and the current traveling object being less than or equal to the first preset threshold, performing at least one of collision warning or driving control further comprises:
  in response to the second suspected collision object trending to be distant from the collision region, not performing at least one of collision warning or driving control, wherein the driving control comprises at least one of: braking deceleration or changing a driving direction.

10. The method according to claim 5, further comprising:
  detecting, by using the neural network, a target object in the current frame image to obtain a detection box of the target object in the current frame image;
  predicting, based on detection boxes of the target object in the previous N frame images, an object box of the target object in the current frame image, wherein the previous N frame images comprise N frame images located before the current frame image and arranged by an image acquisition order, and N is an integer greater than zero; and
  determining, according to the detection box and the object box of the target object in the current frame image, detection box information of the target object in the current frame image; and
  wherein in response to the suspected collision objects being persons or robots, the respectively predicting, based on detection box information of the forward suspected collision object in previous N frame images and a current frame image, movement information of each suspected collision object comprises:
  using the neural network to predict behaviors of the persons or the robots based on the detection box information in the current frame image to obtain predicted behavior information of the persons or the robots in the current frame image, wherein the predicted behavior information comprises: movement direction, movement state, and action classification information; and
  respectively determining, based on the predicted behavior information of the persons or the robots and the detection box information of the persons or the robots in the previous N frame images and the current frame image, movement information of the persons or the robots.

11. The method according to claim 10, wherein the detecting, by using the neural network, a target object in the current frame image to obtain a detection box of the target object in the current frame image comprises:
  extracting, by using the neural network, a feature of the current frame image; and
  determining, based on the extracted feature, the detection box of the target object by using the neural network.

12. The method according to claim 11, wherein the neural network comprises multiple feature layers located at different network depth, respectively; and
  the extracting, by using the neural network, a feature of the current frame image comprises:
  sequentially performing feature extraction on the current frame image input to the neural network by means of feature layers of the neural network, and performing feature fusion on a first feature which is output by a first feature layer having a network depth of i and a second feature which is output by a second feature layer having a network depth of j to obtain a fused feature as an input feature of a third feature layer having a network depth of j+1 or as the feature of the current frame image output by the neural network, wherein $1 \leq i < j$; and
wherein the determining, based on the extracted feature, the detection box of the target object by using the neural network comprises:

determining, based on the extracted feature, candidate boxes comprising target objects by using the neural network;

respectively classifying, based on features of the candidate boxes, the candidate boxes by using the neural network to obtain probability scores that the candidate boxes belong to different types of target objects;

respectively using the types corresponding to maximum probability scores in the probability scores of the candidate boxes as the types of target objects in the candidate boxes; and respectively selecting candidate boxes having an overlapping rate greater than a preset threshold and having the same type of target objects as a group of candidate boxes, and selecting, from a group of candidate boxes, a candidate box corresponding to a maximum probability score of the type of the target object as a detection box of the target object.

13. The method according to claim 10, wherein the detecting, by using the neural network, a target object in the current frame image to obtain a detection box of the target object in the current frame image comprises:

in response to the current frame image being a first frame image in a frame sequence, detecting, by using the neural network, the target object in the current frame image, wherein the frame sequence comprises: M frame images arranged by the image acquisition order, and M is an integer greater than one;

in response to the current frame image being not the first frame image in the frame sequence, regressing, based on detection box information of the first frame image in the frame sequence, a detection box of the target object in the current frame image; and wherein the predicting, based on detection boxes of the target object in the previous N frame images, an object box of the target object in the current frame image comprises: for a same target object in the previous N frame images, fitting, according to sizes and positions of the detection boxes of the same target object in the previous N frame images, a speed and an acceleration of changes in the sizes and positions of the detection boxes of the same target object in the previous N frame images; and predicting, according to the speed and the acceleration of changes in the sizes and positions of the detection boxes of the same target object in the previous N frame images, a size and a position of an object box of the same target object in the current frame image.

14. The method according to claim 13, wherein the regressing, based on detection box information of the first frame image in the frame sequence, a detection box of the target object in the current frame image comprises:

taking, based on the detection box information of the first frame image, a center point of a detection box determined according to detection box information in the first frame image as a center point, and capturing, in the current frame image, a regional image having at least one of a length or width correspondingly greater than at least one of length or width of the determined detection box;

detecting, by using the neural network, a target object in the regional image to obtain the detection box of the target object in the regional image; and determining, according to the detection box of the target object in the regional image and a position of the regional image in the current frame image, the detection box information of the target object in the current frame image.

15. The method according to claim 13, wherein the determining detection box information of the target object in the current frame image according to the detection box and the object box of the target object comprises:

acquiring, for a first target object in the target objects which has an overlapping rate between the detection box and the object box equal to or greater than a preset threshold, average values of the detection box and the object box of the first target object in terms of the size and the position as detection box information of the first target object in the current frame image, wherein the detection box information comprises: the size and the position of the detection box.

16. The method according to claim 13, wherein the determining detection box information of the target object in the current frame image according to the detection box and the object box of the target object comprises:

for a second target object in the target objects which has an overlapping rate between the detection box and the object box less than a preset threshold, taking a predicted size and position of the object box of the second target object as the detection box information of the second target object in the current frame image.

17. The method according to claim 13, wherein the determining detection box information of the target object in the current frame image according to the detection box and the object box of the target object comprises:

for a third target object in the target objects which does not have a detection box corresponding to the object box in the current frame image, taking a predicted size and position of the object box of the third target object as detection box information of the third target object in the current frame image.

18. The method according to claim 10, wherein the using the neural network to predict behaviors of the persons or the robots based on the detection box information in the current frame image to obtain predicted behavior information of the persons or the robots in the current frame image comprises:

performing, based on the detection box information in the current frame image, key point detection on a corresponding person or robot to yield a key point detection result;

acquiring, based on the key point detection result, a head direction and a body direction of the corresponding person or robot;

acquiring, based on the head direction and the body direction of the corresponding person or robot, movement direction of the corresponding person or robot;

classifying, based on the key point detection result, actions of the corresponding person or robot to obtain action classification information of the corresponding person or robot; and classifying, based on the key point detection result, a movement state of the corresponding person or robot to obtain movement state information of the corresponding person or robot.

19. An electronic device, comprising:

a memory, configured to store computer programs; and a processor, configured to execute the compute programs stored in the memory, wherein when the computer programs are executed, the processor is configured to:

detect, based on a neural network, a forward suspected collision object on a road where a current traveling object is located;

respectively predict, based on detection box information of the forward suspected collision object in previous N frame images and a current frame image, movement information of each suspected collision object;

calculate, based on the movement information of each suspected collision object, a collision time between the current traveling object and each suspected collision object; and perform, according to the collision time, forward collision control on the current traveling object, wherein the forward collision control comprises at least one of forward collision warning or driving control.

20. A non-transitory computer-readable storage medium having computer programs stored thereon, wherein when the computer programs are executed by a processor, the processor is configured to:

detect, based on a neural network, a forward suspected collision object on a road where a current traveling object is located;

respectively predict, based on detection box information of the forward suspected collision object in previous N frame images and a current frame image, movement information of each suspected collision object;

calculate, based on the movement information of each suspected collision object, a collision time between the current traveling object and each suspected collision object; and perform, according to the collision time, forward collision control on the current traveling object, wherein the forward collision control comprises at least one of forward collision warning or driving control.

* * * * *